US009004190B2

(12) United States Patent
Zorn

(10) Patent No.: US 9,004,190 B2
(45) Date of Patent: Apr. 14, 2015

(54) HAND HELD MATERIAL MOVING TOOL

(76) Inventor: Ronald J. Zorn, San Tan Valley, AZ (US)

(*) Notice: Subject to any disclaimer, the term of this patent is extended or adjusted under 35 U.S.C. 154(b) by 269 days.

(21) Appl. No.: 13/572,014

(22) Filed: Aug. 10, 2012

(65) Prior Publication Data

US 2013/0047381 A1 Feb. 28, 2013

Related U.S. Application Data

(60) Provisional application No. 61/527,863, filed on Aug. 26, 2011.

(51) Int. Cl.
*A01B 1/00* (2006.01)
*B25G 1/06* (2006.01)

(52) U.S. Cl.
CPC . *B25G 1/06* (2013.01); *Y10T 16/476* (2015.01)

(58) Field of Classification Search
USPC .......... 172/371; 111/92, 99; 15/79.1; 404/97, 404/112; 294/49, 53.5
See application file for complete search history.

(56) References Cited

U.S. PATENT DOCUMENTS

| | | | | |
|---|---|---|---|---|
| 324,178 | A | 8/1885 | Skinner | |
| 545,691 | A * | 9/1895 | Howland | 15/172 |
| 844,204 | A * | 2/1907 | Sohn | 15/235.4 |
| 1,548,452 | A * | 8/1925 | Fyhrie | 404/97 |
| 1,564,172 | A * | 12/1925 | Busch | 15/235.8 |
| 2,021,158 | A * | 11/1935 | Stearns | 15/145 |
| 2,100,379 | A * | 11/1937 | Miller et al. | 294/53.5 |
| 2,196,365 | A * | 4/1940 | Schulman | 15/153 |
| 4,245,411 | A | 1/1981 | McMath | |
| 4,787,661 | A | 11/1988 | Rutledge | |
| 4,944,541 | A | 7/1990 | Waldschmidt | |
| 4,982,960 | A | 1/1991 | David | |
| 4,991,324 | A * | 2/1991 | Fine et al. | 37/284 |
| 5,165,144 | A | 11/1992 | Nisenbaum | |
| 5,244,305 | A | 9/1993 | Lindley | |
| 5,406,671 | A * | 4/1995 | Green | 15/235.5 |
| 5,496,085 | A | 3/1996 | Middleton | |
| 5,611,102 | A * | 3/1997 | Lesinsky et al. | 15/235.5 |
| 5,699,580 | A * | 12/1997 | Silverstein | 15/235.7 |
| 5,752,285 | A * | 5/1998 | Bendheim et al. | 7/167 |
| 5,871,246 | A | 2/1999 | Simdom | |
| 5,906,060 | A | 5/1999 | Tonry | |
| 5,980,154 | A | 11/1999 | Record | |
| 6,283,522 | B1 | 9/2001 | Renaud | |
| 6,435,284 | B1 * | 8/2002 | Aman | 172/371 |
| 6,488,442 | B2 * | 12/2002 | Boudreaux, Sr. | 404/97 |
| 6,704,968 | B2 | 3/2004 | Lau | |
| 6,883,845 | B2 | 4/2005 | Douziech | |
| 7,010,828 | B1 * | 3/2006 | Flores et al. | 15/235.3 |
| 7,025,397 | B2 | 4/2006 | Simone | |
| 7,237,814 | B2 * | 7/2007 | Handzlik | 294/54.5 |
| 7,491,013 | B2 | 2/2009 | Bohse | |
| 7,647,703 | B2 * | 1/2010 | Demar et al. | 30/301 |
| 7,661,258 | B1 | 2/2010 | Petruzelli | |
| 7,681,933 | B2 * | 3/2010 | Chesness | 294/54.5 |
| 7,690,070 | B2 * | 4/2010 | Jung | 15/144.1 |

(Continued)

*Primary Examiner* — Jamie L McGowan
(74) *Attorney, Agent, or Firm* — Boardman & Clark LLP

(57) ABSTRACT

A hand held material moving tool is disclosed. The material engaging implement has a material engaging portion adapted for movement of material. A handle is connected to a top surface of the tool. The handle is positioned low and in close proximity to the material engaging portion of the implement. The handle is connected to the tool by a swivel mechanism permitting a predetermined amount of pivot of the implement in relation to the handle about an axis.

11 Claims, 11 Drawing Sheets

(56) References Cited

U.S. PATENT DOCUMENTS

| | | | | |
|---|---|---|---|---|
| D617,159 | S | 6/2010 | Blanchard | |
| 7,878,264 | B2 | 2/2011 | Koch et al. | |
| 7,909,533 | B2 | 3/2011 | Quenzi et al. | |
| 7,930,791 | B1 * | 4/2011 | Morad | 15/115 |
| 8,166,677 | B1 * | 5/2012 | Woyak | 37/265 |
| 2004/0075286 | A1 | 4/2004 | Skowron | |
| 2005/0012348 | A1 * | 1/2005 | Handzlik | 294/54.5 |
| 2005/0099029 | A1 | 5/2005 | Lerman | |
| 2005/0206178 | A1 * | 9/2005 | Hoeft | 294/58 |
| 2007/0028582 | A1 | 2/2007 | Giguere | |
| 2007/0071540 | A1 * | 3/2007 | Jung | 401/270 |
| 2008/0111387 | A1 * | 5/2008 | Petruzelli | 294/54.5 |
| 2010/0226718 | A1 | 9/2010 | Obergfoll | |

* cited by examiner

HAND HELD MATERIAL MOVING TOOL

CROSS-REFERENCE TO RELATED APPLICATIONS

The present application claims priority to U.S. Provisional Patent Application, Ser. No. 61/527,863, filed Aug. 26, 2011, entitled HAND-HELD MATERIAL MOVING TOOL, the contents of which is incorporated herein in its entirety by reference.

FIELD

The present inventions relate to the field of tools. In particular, the present inventions relate to hand held tools used to move material.

BACKGROUND

Hand held tools for the movement of various materials are well known. Commonly, tools, such as may be used for gardening, consist of a long handle connected to an implement (e.g., a rake, a hoe, a shovel, a pitch fork, etc.). These long handled tools generally require the user to be in a standing position to use the tool. Unfortunately, in many instances such long handled tools place the user in an awkward position and can result in strain or injury to the user's muscles in attempting to move material. In addition, due to the distance away from the material and the position of the user, the amount of material that can be moved is limited and often minimal.

Attempts have been made, particularly in the area of snow shovels, to address the strain and injury to a user from a long handled tool. These attempts often include the addition of a handle to the implement, forming a tool with multiple long handles. Unfortunately, these proposed solutions do not improve upon the amount of material that can be moved with the tool.

Small tools, such as a garden trowel, while placing the user in close proximity to the material being moved, can only move a small amount of material. Further, these small tools include a handle extending at the same angle or in the same plane as the tool, and do not place the user in an optimized position for moving such material.

SUMMARY

A hand held material moving tool is disclosed. The hand held tool has a material engaging implement with a material engaging portion adapted for movement of material. A pair of handles is connected to a top surface of the tool. The handles are positioned low and in close proximity to the material engaging portion of the implement. The handles are connected to the tool by a swivel mechanism permitting a predetermined amount of pivot of the implement in relation to the pair of handles about an axis.

An alternative hand held material moving tool is also disclosed. The tool includes a material engaging implement having a material engaging portion adapted for movement of material, and a body joined to the material engaging implement. The body has a plurality of apertures. A positionable handle is detachably connected to a top surface of the body. The handle is positionable in any one of the plurality of apertures and is positioned low and in close proximity to the material engaging portion of the implement. The handle is connected to the body by a swivel mechanism permitting a predetermined amount of pivot of the implement in relation to the handle about an axis.

These and other features and advantages of devices, systems, and methods according to this invention are described in, or are apparent from, the following detailed description of various examples of embodiments.

BRIEF DESCRIPTION OF DRAWINGS

Various examples of embodiments of the systems, devices, and methods according to this invention will be described in detail, with reference to the following figures, wherein.

Figure 1:
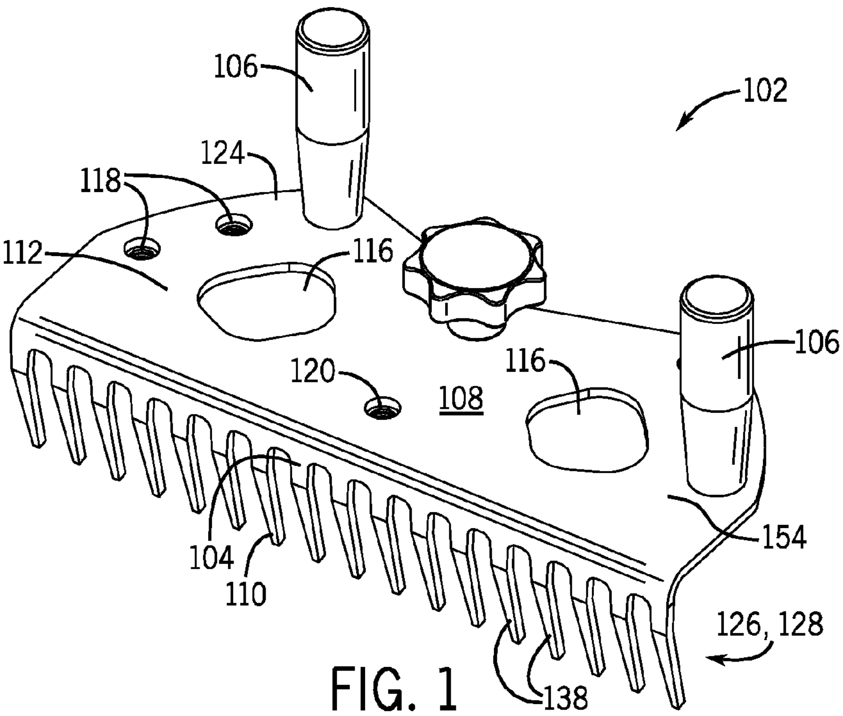
FIG. 1 is a front perspective view of one or more examples of a material moving tool, showing a material moving tool with a rake implement.

It should be understood that the drawings are not necessarily to scale. In certain instances, details that are not necessary to the understanding of the invention or render other details difficult to perceive may have been omitted. It should be understood, of course, that the Figures are provided by way of example and the invention is not necessarily limited to the particular embodiments illustrated herein.

DETAILED DESCRIPTION

Generally, a material moving tool 102 is provided in the Figures.

The material may be any material susceptible to action or movement by a tool. The material described herein may be any form of moveable material, including but not limited to, earth materials or naturally occurring materials (e.g., rock, sand, dirt, grass, leaves, snow, ice, etc.), and "man-made" type materials, such as concrete or cement, as well as liquids and loose or fragmented or particle-type materials (e.g., powders, grains, etc.).

In one or more particular examples of embodiments, as shown in the Figures, the material moving tool 102 is a hand held material moving tool. The tool 102 includes a material engaging implement 104 and one or more handles 106 connected to a top surface 108 of the tool. The handles 106 are positioned low and in close proximity to a material engaging portion 110 of the implement 104, and may be connected to the material engaging implement 104 by a swivel mechanism permitting a predetermined amount of pivot of the implement 104 in relation to the handles 106 about an axis.

Figure 2:
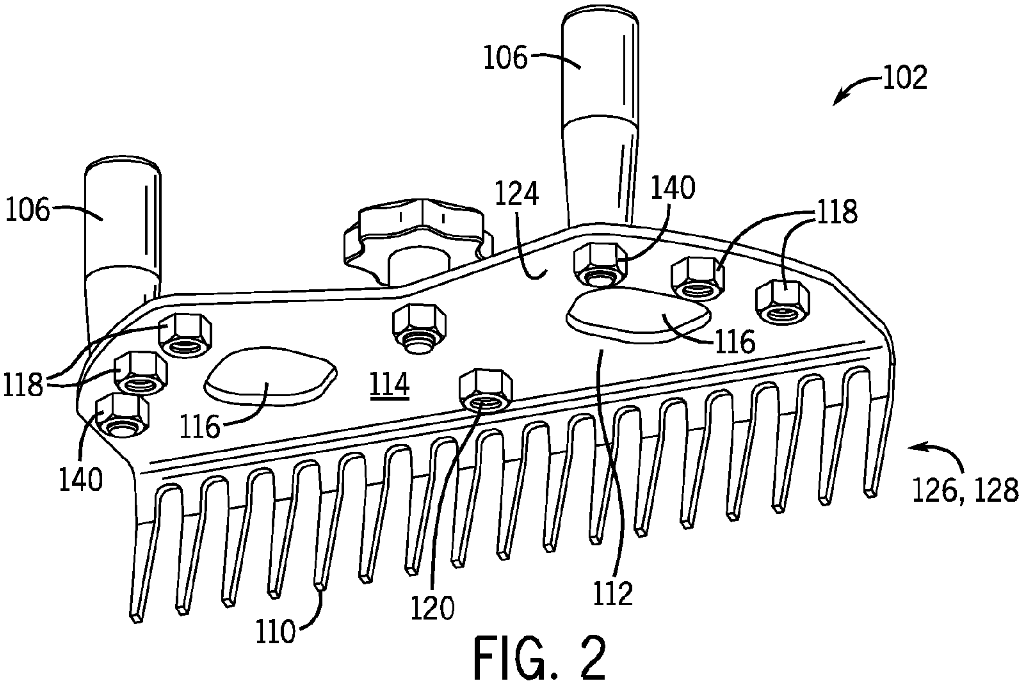
FIG. 2 is a rear perspective view of the material moving tool shown in FIG. 1.

As seen by reference to FIGS. 1-2, the material moving tool 102 has a tool body 112. The tool body 112, in the illustrative examples, is shown as a flat planar plate having a top surface 108 and a bottom surface 114; although variations on shapes and dimensions would not depart from the overall scope of the present invention. The tool body 112 includes a plurality of apertures (e.g., 116, 118, 120). The apertures may include viewing and/or clearance apertures 116, handle support apertures 118, and/or accessory tool support apertures 120. Each of the foregoing apertures or any number or combination of the foregoing apertures may be identical in size, tooling, thread or unthreaded, or may vary.

The tool body 112 has, or is connected or otherwise joined to, an implement 104 forming the material engaging end or action end of the tool. The implement 104 may be a tool head designed for a particular material moving application. The tool body 112 may be, or be connected to, one of a variety of implements, or more than one implement 104. The tool body 112 and implement 104, including the material engaging end of the tool may be separable and interchangeable or may be formed integral as a single, uniform element.

Figure 11:
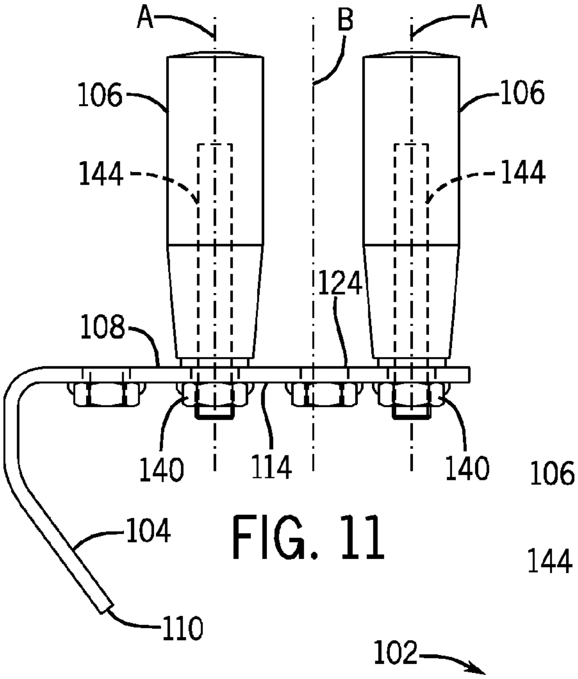
FIG. 11 is a side elevation view of the material moving tool shown in FIG.1.
Figure 12:
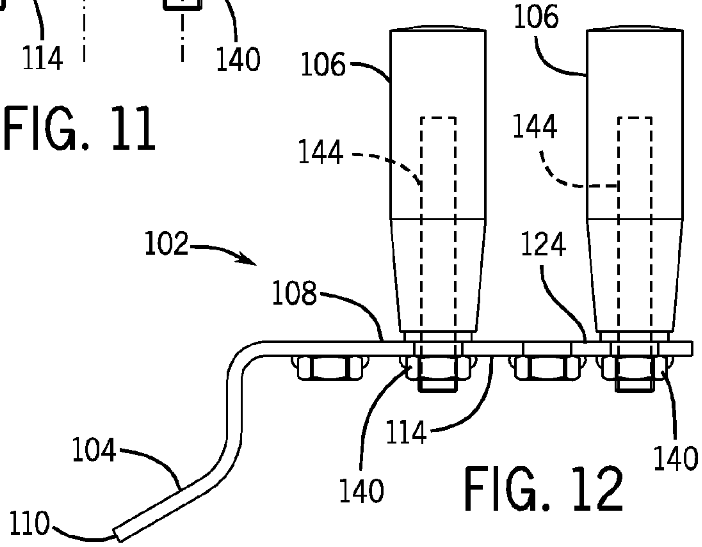
FIG. 12 is a side elevation view of the material moving tool, showing an alternative example of the tool shown in FIG. 11.

In the illustrated examples of embodiments, the material engaging end or action end 110 or implement 104 extends downward below surface 118 and more generally, below a handle support segment 124 of the tool body 112 (e.g., FIGS. 11-13). In particular, the material engaging portion 110 of the implement 104 or a portion thereof extends at an angle greater than 0° and less than 180° from the tool body 112, and in one or more examples of embodiments extends at an approximate right angle to the tool body 112, in one or more alternative examples of embodiments is an approximate acute angle, or less than 90° from the tool body (see FIG. 11), and in one or more further alternative examples of embodiments is an approximate convex angle, or greater than 90° from the tool body (see FIG. 12). As shown in the Figures, the material engaging portion 110 of the implement 104 may have a degree of curvature or segments positioned at different angles from one another (see FIGS. 11-12). While specific examples are provided, alternate geometries would be acceptable for the purposes provided herein.

As indicated, the material engaging implement 104 has a material engaging portion 110. The material engaging portion 110 is adapted for movement of the materials described. In one example, the hand held material moving tool 102 may include a tool head for an earth material moving application.

Figure 3:
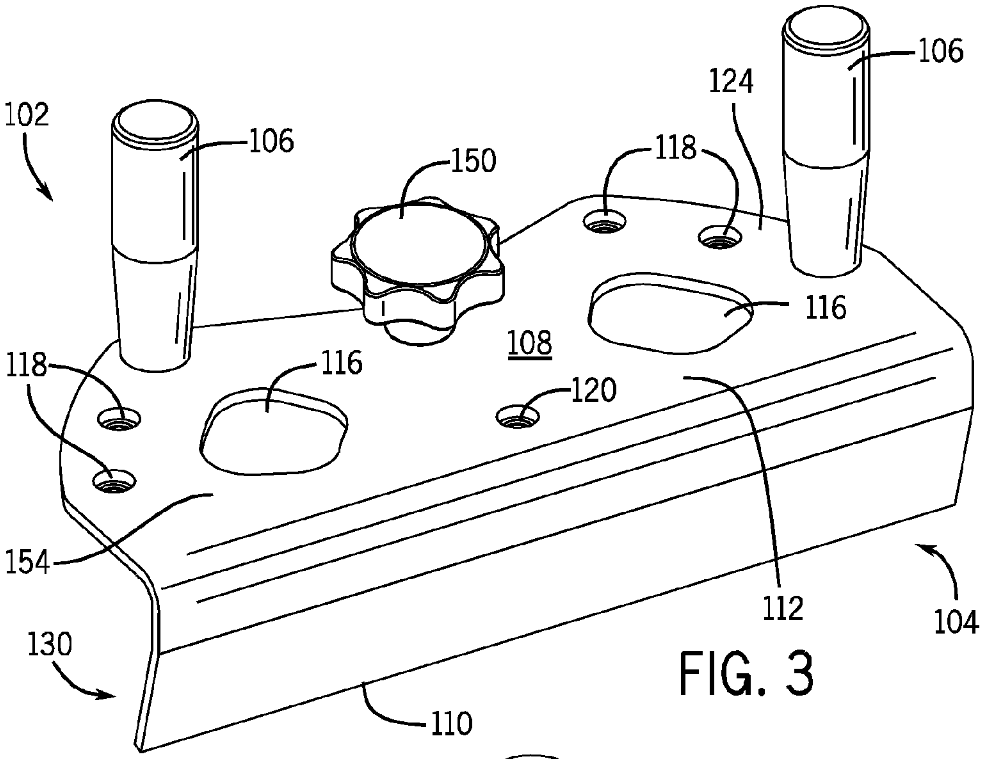
FIG. 3 is a perspective view of one or more examples of a material moving tool, showing a material moving tool with a blade implement.
Figure 4:
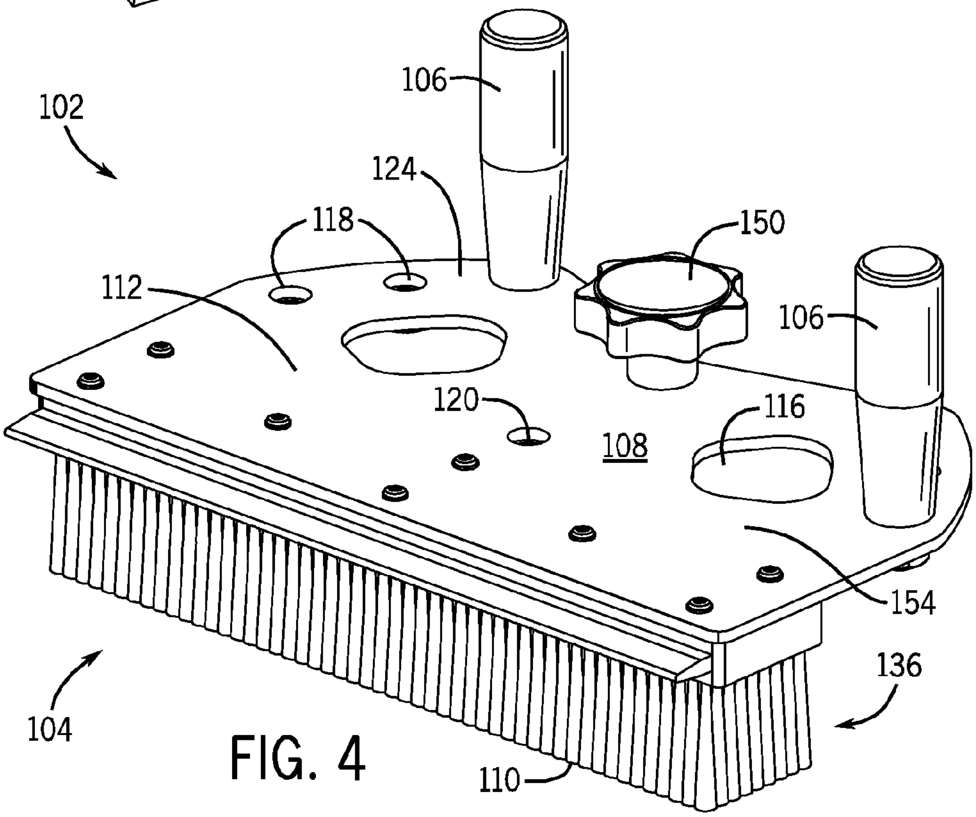
FIG. 4 is a perspective view of one or more examples of a material moving tool, showing a material moving tool with a brush implement.
Figure 5:
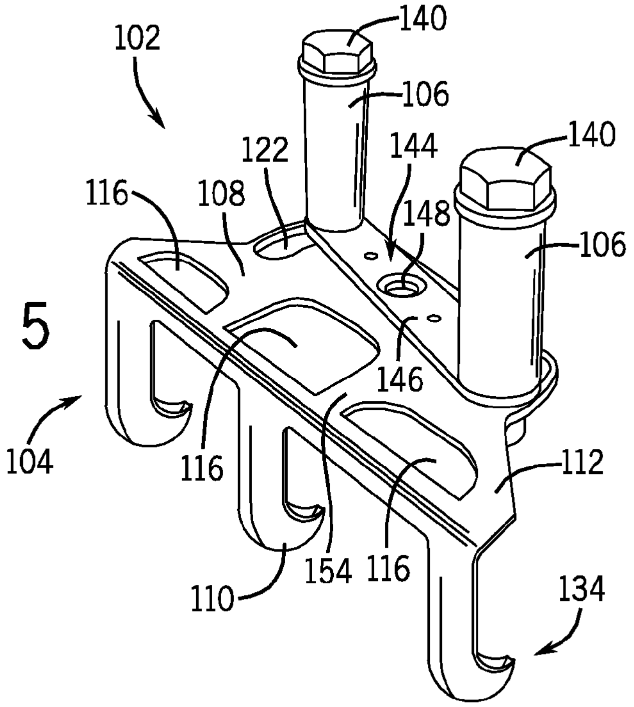
FIG. 5 is a perspective view of one or more examples of a material moving tool, showing a material moving tool with a claw implement.

One or more examples of implements 104 are illustrated in the Figures. For example, the implement, or the engaging portion of the tool, may be a rake head 126, a leaf rake 128, a blade 130 or hoe, a claw 134, bristles 136 and the like. Accordingly, the material engaging end 110 or action end of the tool body 112 may be a rake or fork having a plurality of tines 138, such as is shown in FIGS. 1-2. In the alternative, the material engaging end or action end may be or include a blade 130 or hoe, such as is shown in FIG. 3. The material engaging end or action end 110 may also, alternatively, include a brush or plurality of bristles 136 as shown in FIG. 4. The material engaging end or action end may also, alternatively, include a claw or plurality of claws 134 as shown in FIG. 5. While a number of material engaging devices are illustrated in the Figures and described herein, any action end and/or tool suitable for use in moving material as set forth herein may be acceptable for use with the embodiments disclosed. Likewise, the material engaging portion 110 or implement 104 may also be a custom designed head for a particular material moving application.

In one or more examples of embodiments, the implement 104 comprises a size suitable for movement of a large amount of material, such as is traditionally accomplished by a long handled tool. As illustrative examples of the foregoing, the implement 104 may be a rake 126 having from 9 to 30 tines, and in this regard, may be from approximately 1 foot to 1.5 feet or greater in width. An implement 104 having a blade 130 or brush 136 may, likewise, have a similar width. The implement 104 depth, that is, the degree or amount by which the material engaging portion 110 extends away from the bottom surface 114 of the tool or tool body 112, may be any suitable depth for accomplishing the desired task. As an illustrative example, the implement 104 or material engaging end may extend to a depth of approximately 3 inches to 4 inches from the tool body 112.

Figure 6:
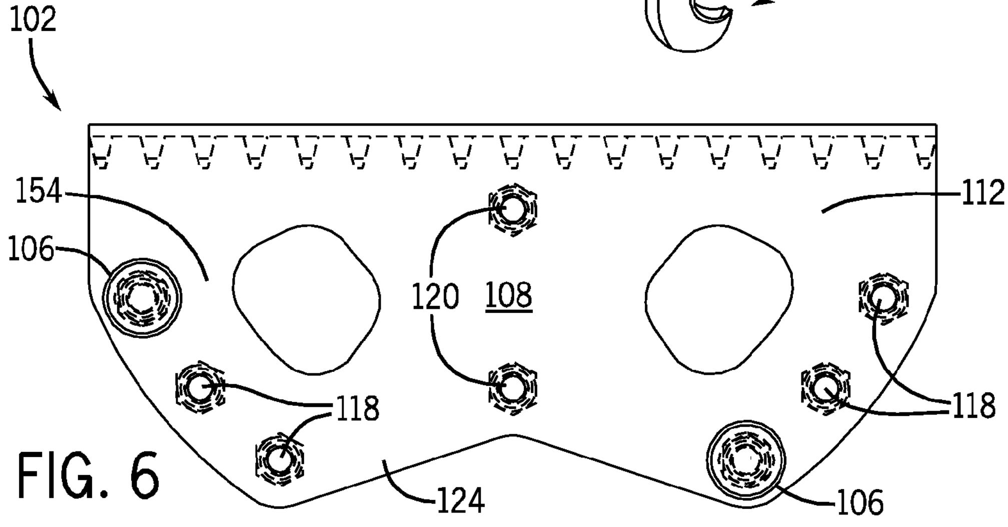
FIG. 6 is a top plan view of one or more alternative examples of a material moving tool as shown in FIG. 1, showing examples of positions for apertures and handles on the material moving tool shown in FIG. 1.
Figure 7:
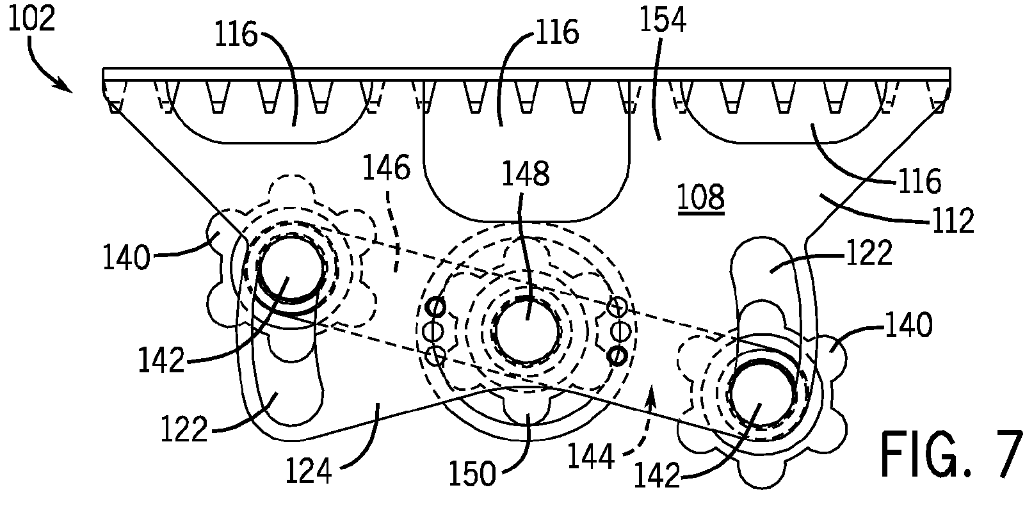
FIG. 7 is a top plan view of one or more alternative examples of a material moving tool, showing examples of positions for apertures, slots and handles on the material moving tool.
Figure 8:
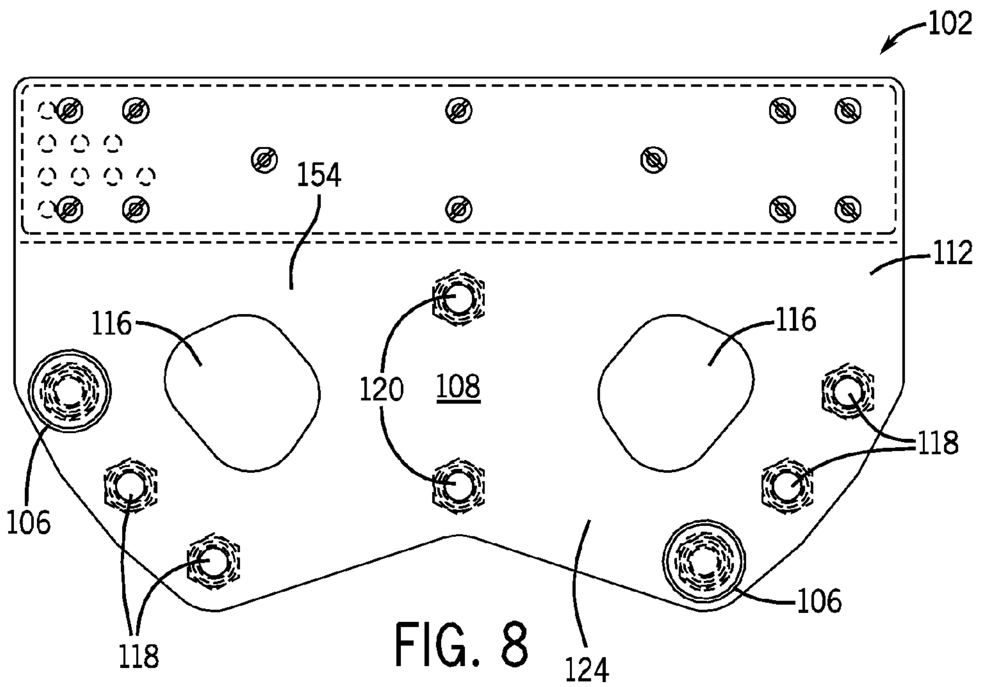
FIG. 8 is a top plan view of one or more alternative examples of a material moving tool shown in FIG. 3, showing examples of positions for apertures and handles on the material moving tool arranged for attachment of an implement.
Figure 9:
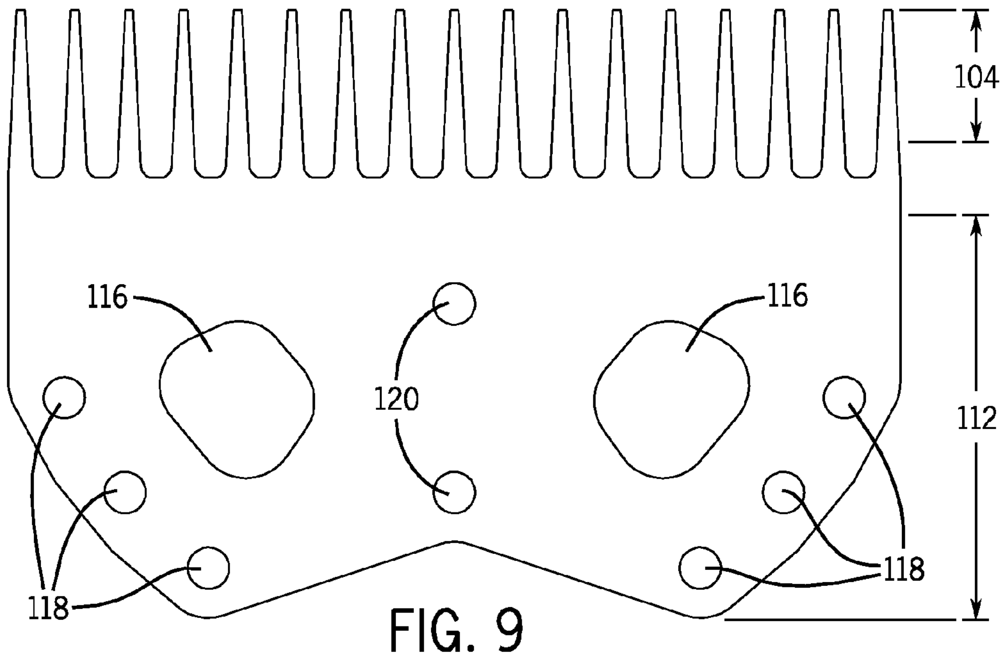
FIG. 9 is a plan view of one or more alternative examples of a material form for forming a material moving tool as shown in FIG. 1, showing the tool prior to bending of the implement into its final form.
Figure 10:
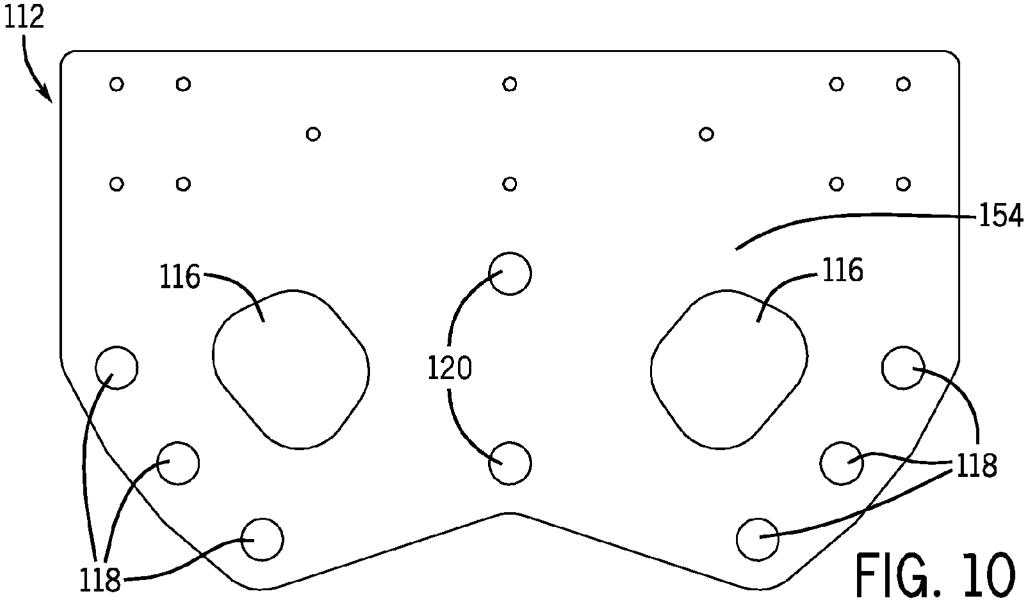
FIG. 10 is a plan view of one or more alternative examples of a material form for forming a material moving tool as shown in FIG. 3, showing the tool prior to attachment of the implement into its final form.

As can be seen by reference to FIGS. 6-8, the tool body 112 also has a handle support segment 124. The handle support segment 124 shown includes spaced apart apertures 118 adapted to receive a portion of a handle 106. Examples of the apertures 118 are reflected in FIGS. 9-10. The aperture may be a threaded aperture which receives a mating thread on the handle 106, or may be a through bore which receives a pin or shaft of the handle, or may be a slot, or more than one, or combinations of the foregoing. The apertures 118 on the handle support segment 124 may be symmetrically aligned with corresponding apertures 118 such that first and second halves of the tool are mirror images.

Handles 106 are connected to a top surface 108 of the material engaging implement 104 (see FIGS. 11-15). The handle or a plurality of handles 106 may be placed in any combination of apertures 118 to provide a desired handle positioning. As discussed, the handles 106 are ergonomically located or positioned low and in close proximity to the material engaging portion 110 of the implement 104.

As indicated, the tool body 112 has a plurality of apertures 118 (e.g., see FIGS. 9-10), which apertures may be provided on the handle support segment 124. A positionable handle 106 is detachably connected to a top surface 108 of the body. The handle 106 is positionable in any one of the plurality of apertures 118. A pair of handles 106 may be joined to the tool body 112 as described and may be spaced apart. In the alternative, a handle or pair of handles 106 may include a portion received within an aperture forming a slot, or a plurality of apertures forming slots 122, on the material engaging implement 104. To this end, a slot 122 or more than one slot may also be provided on the tool body 112.

In one or more examples of embodiments, the handle 106 may be secured, coupled or otherwise joined to the tool body 112 directly.

The handles 106 may be adjustable and/or moveable to a variety of positions. For example, the handles 106 may be adjusted or positioned laterally, vertically, horizontally or otherwise to best fit the needs and feel of the user. The handles 106 may also be vertically positioned, horizontally positioned, angled or otherwise arranged for ergonomic handling of the tool and/or implement 104.

In addition, the handles 106 may be detachable and/or interchangeable with an additional or alternative one or more handles 106 and/or movable to different locations (e.g. apertures on the tool body). Thus, the handles 106 may be provided with a segment adapted for removable connection of the handle to the tool body 112 and/or the pivot arm 146.

As can be seen by reference to FIGS. 11-15, a retention mechanism 140 may be used to secure or connect the handle 106 to the tool body 112 and/or pivot arm 146 (discussed below). The retention mechanism 140 may be on the top of the handle 106 or at the base of the handle. In this regard, the handle 106 may have a pin which extends into an aperture in the tool body 112 and is secured in place by any suitable means. For instance, the handle 106 may be secured by having threads on the pin which mate with corresponding threads on the aperture, and/or the handle 106 or pin may receive a connector, such as a nut or pin cap secured, for example, on an opposing surface of the tool body 112. In the illustrated example, the retention mechanism 140 may be a threaded device such as a bolt or screw-head or nut which device is received by a corresponding or mating mechanism on the handle 106 or the tool body 112. In one or more examples of embodiments, the bottom of the handle 106 or a portion of the handle may extend below the tool body 112, and through an aperture or through the slots 122 in the tool body 112 (and pivot arm 146 if present). In this example, the handles 106 may be retained in position by a retention mechanism 140, such as but not limited to a threaded device described hereinabove, positioned below the tool body 112. In one or more alternative examples of embodiments, as shown in FIG. 14, the handles 106 may be or include a T-handle having a grip knob 142. The grip knob 142 may be secured onto the handle 106 and include a surface adapted for griping and easy removal of the knob from the handle to permit removal. Other suitable retention devices 140 for attachment of the handle 106 to the tool body 112 include, but are not limited to: mating threads on the handle and tool body; a snap fit arrangement; a friction fit arrangement; a tongue and groove arrangement; an adhesive; and the like.

The handle 106 may be connected to the material engaging implement 104 by a swivel mechanism 144 permitting a predetermined amount of pivot of the implement 104 in relation to the handle 106 about an axis.

Figure 13:
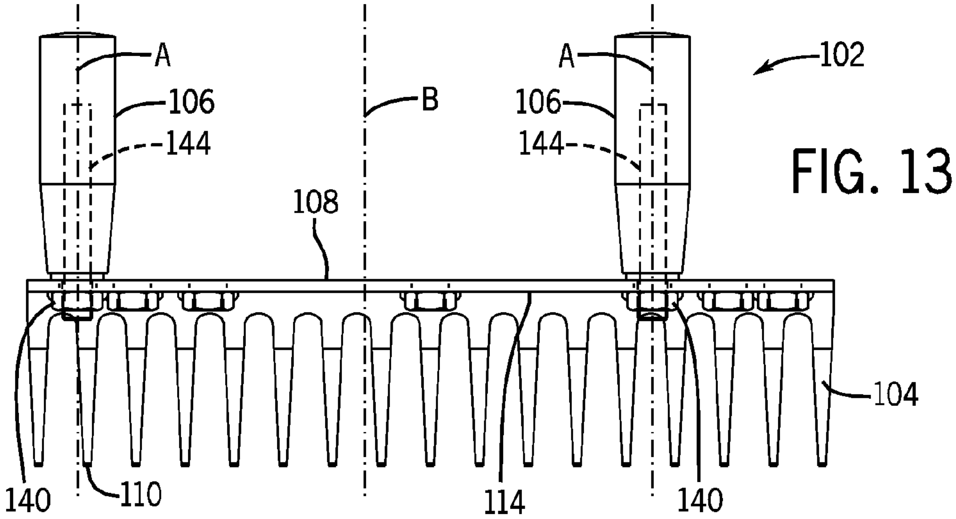
FIG. 13 is a rear elevation view of the material moving tool shown in FIG. 1.
Figure 14:
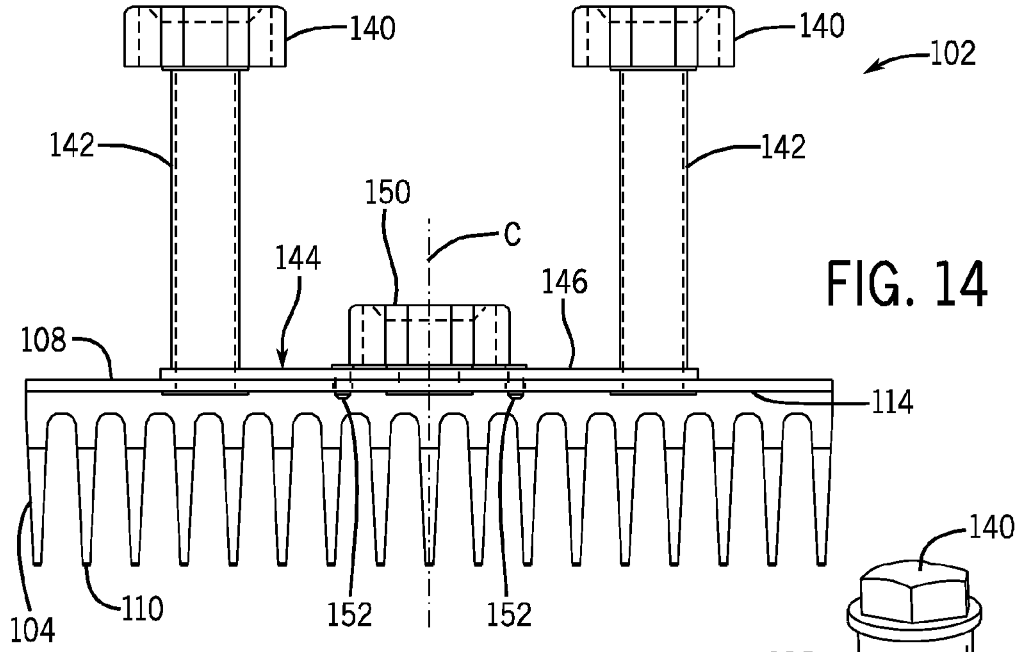
FIG. 14 is a rear elevation view of an alternative example of the material moving tool shown in FIG. 13.

The handle or pair of handles 106 may be pivotable, forming the swivel mechanism 144, as shown, for instance in FIGS. 1, 6, & 13. The handle 106 may be rotatable or pivotable in place such that it pivots around an axis "A" extending through the center of the handle. For example, the handles 106 may include a rotating grip which is retained on the handle by a retention mechanism on the top of the handle. In one particular example, the handle(s) 106 have an outer gripping surface which rotates around a central axis, which may be formed by a rod, or shaft, or other structure. Each of the handles 106 individually may pivot about a central axis "A" extending through the longitudinal center of the handle. In combination, a pair of pivotable handles 106, attached to the tool body 112, permit a predetermined amount of pivot of the implement 104 in relation to the handles 106. That is, the device, when gripped by the user at the pair of pivotable handles 106, is free to pivot about an axis "B" positioned centrally between the pair of handles 106, thereby forming a swivel mechanism 144. Thus, joint action by a user on both rotatable handles 106 may cause the tool to rotate or pivot about an axis positioned between the two pivotable handles 106.

In illustrated examples shown in FIGS. 5, 7, 14 & 15, a pair of handles 106 is connected to the material engaging implement 104 by a swivel mechanism 144 formed by a pivot arm 146 carrying the handles 106, permitting a predetermined amount of pivot of the implement 104 in relation to the pair of handles 106 about a centralized axis "C" formed by a center pivot. Specifically, the pivot arm 146 includes first and second handles 106. The handle, or plurality of handles 106, may be connected to the tool body 112 or handle support segment 124 by a swivel mechanism 144 permitting the implement 104 to pivot in relation to the attached handle 106 about axis "C". Specifically, the tool body 112 carries a pivot arm 146 on the handle support segment 124 of the tool. The pivot arm 146 carries a plurality of handles, and in the illustrated examples includes two handles 106, although more or less than two handles is also contemplated. The pivot arm 146 is attached to the tool body 112 by a center pivot 148. The pivot arm 146 pivots about the axis "C" of the center pivot 148. In one example, the center pivot 148 may optionally include an aperture extending through the pivot mechanism, and which further extends through the tool body 112. While the pivot mechanism is described as a "center pivot" it is contemplated that the pivot mechanism may be off-center without departing from the overall scope of the present invention. Likewise, while the pivot arm 146 is illustrated on a top surface 108 of the tool body 112, it is contemplated that the pivot arm 146 may be carried below the top surface 108.

Figure 15:
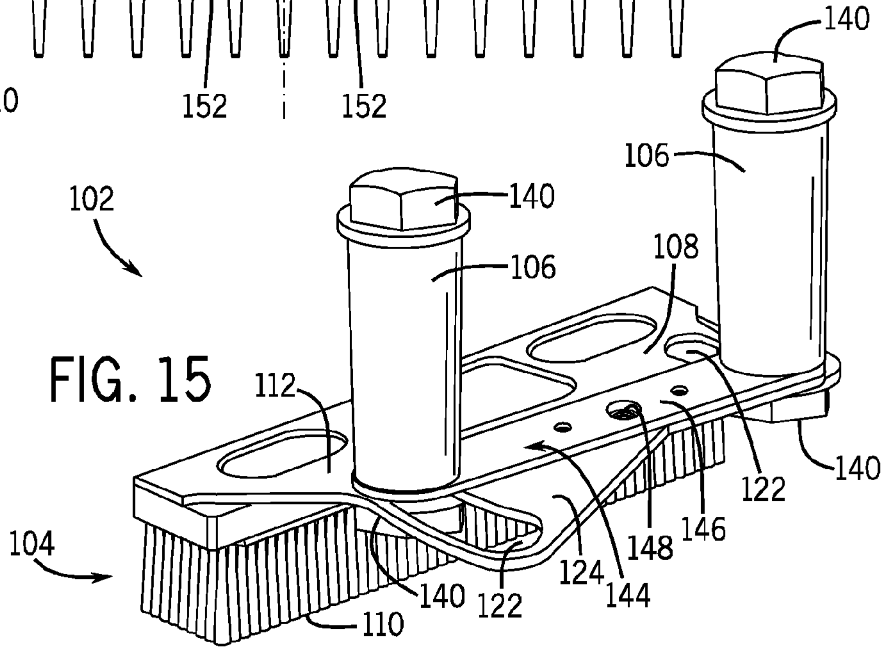
FIG. 15 is a perspective view of an alternative example of the material moving tool shown in FIG. 3, showing a swivel mechanism including a pivot bar and slots.

A device for modifying the freedom of rotation about the axis may also be provided (see FIGS. 14-15). One or more slots 122 may be provided in the tool body 112, for example on the handle support segment 124, adjacent to or spaced from the center pivot. The slots 122 are adapted to engage a pin carried by the pivot arm 146 or engage a portion of the pivot handle 106. The slots 122 are arranged to limit the degree or amount of pivot of the pivot arm 146 about the center pivot 148. The limit of rotation or pivot may be predetermined or controlled by the size and interaction of the pin and/or handle 106 and/or slot 122. The material moving tool 102 is also contemplated for use without the center pivot 148, in which case one or more slots 122 may be provided for engagement with a corresponding pin and/or handle 106 to provide a limited amount of movement and/or rotation of the pivot arm 146 across the tool body 112.

In one further alternative example, illustrated in FIGS. 7, 14, a center screw 150 is provided with locating pins 152. The locating pins 152 may be arranged on one or more sides of the center screw 150 and center pivot axis 148. The locating pins 152 may be engagable with the pivot handle 106 and optionally the tool body 112 to lock the pivot arm 146 in position. In the alternative, the center screw 150 may secure the pivot arm 146 in position on the tool body 112 by engagement of the locating pins 152 with the pivot arm 146, but allow rotation of the pivot arm and center screw in the secured position.

In one further example, a tension adjustment device may be provided to restrict the rotation or pivotable movement of the handle(s) 106 or pivot bar. A suitable example includes a device which can be adjusted to increase friction between the swivel mechanism and the tool body.

The handles 106 may also include an ergonomic grip or shape suitable for grasp or comfort of the user. In a further alternative, the handles 106 may include a cylindrical or other geometric surface. In the illustrated example, the handles 106 have a width and height suitable for, or sized for, a user's hand (see FIG. 28). In the alternative, the handles 106 may be formed to include a "high grip" or a length which is greater than the width of the user's hand (see e.g., FIG. 14).

For versatility, a long handle (not shown), attachable to a central location on the implement 104, may be provided for situations when it is more convenient to stand upright or the amount of material moved is not a priority. Optionally, in one or more examples of embodiments, the center pivot 148 may include an aperture (see FIG. 15) which receives a handle. In this regard, the handle may be a tall handle, such as may be used by an individual in a standing position, or may be a short hand-width/grip type handle. The handle is removable and attached such that it can be interchanged and/or used with multiple tools.

The implement 104 or action end 110 of the tool may be separated from the handle support segment 124 of the tool body 112 by an intermediate segment 154 (FIGS. 6-8). The intermediate segment 154 has one or more apertures 116 or cutouts formed in the tool body 112. The apertures 116 in the tool body 112 may be provided in any suitable size or shape. In the example provided, the apertures 116 are sized to permit passage of material through the aperture and over the top surface 108 of the tool body 112 or to provide a view of the material below the tool. Alternative uses and configurations may also be acceptable. Likewise, an intermediate segment 154 that does not include apertures may also be acceptable for use with the embodiments described herein.

Figure 16:
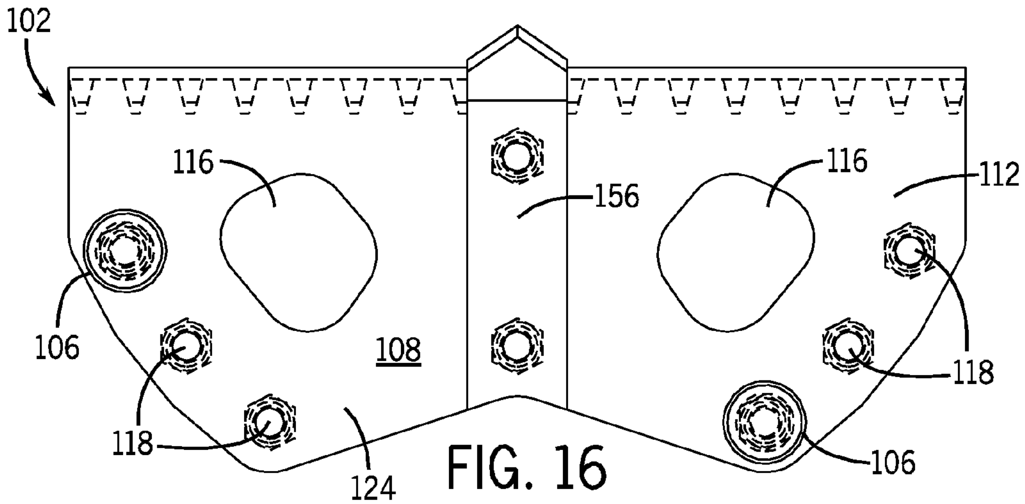
FIG. 16 is a top plan view of the material moving tool shown in FIG. 1, showing an accessory tool coupled to the material moving tool.
Figure 17:
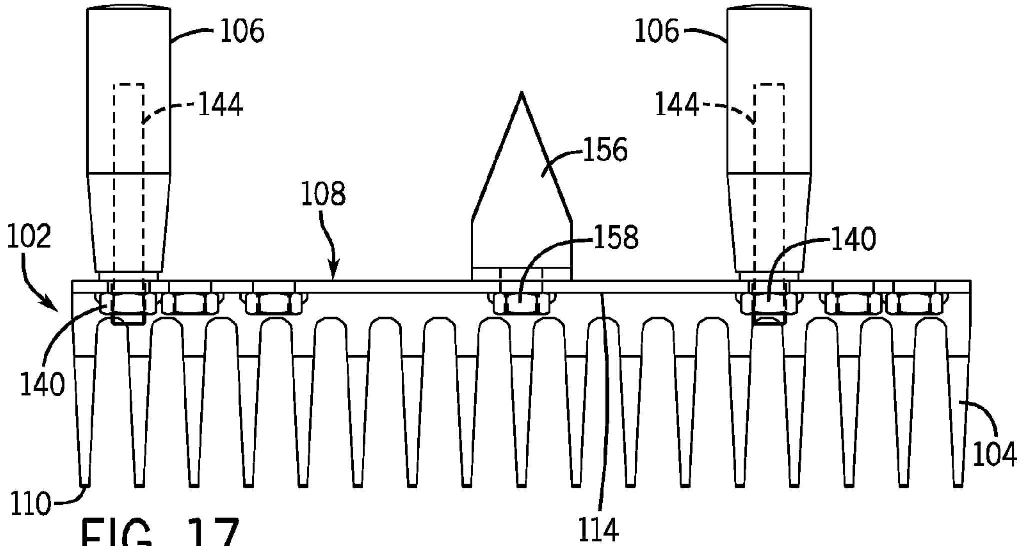
FIG. 17 is a rear elevation view of the material moving tool and accessory tool shown in FIG. 16.
Figure 18:
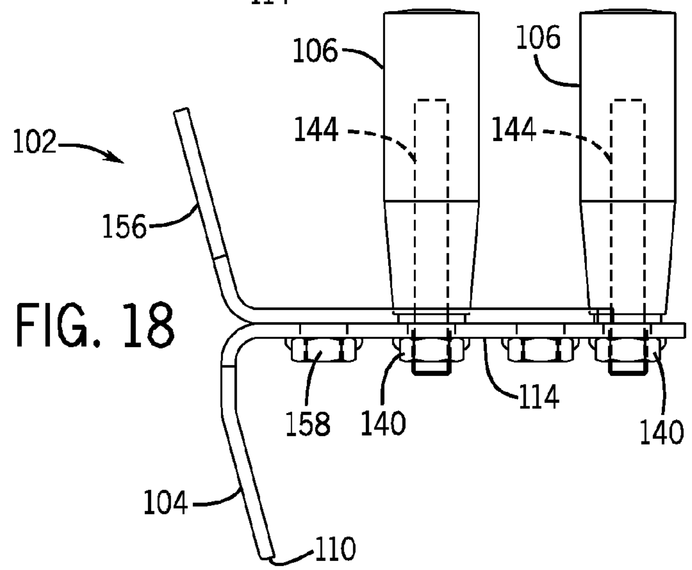
FIG. 18 is a side elevation view of the material moving tool and accessory tool shown in FIG. 16.
Figure 20:
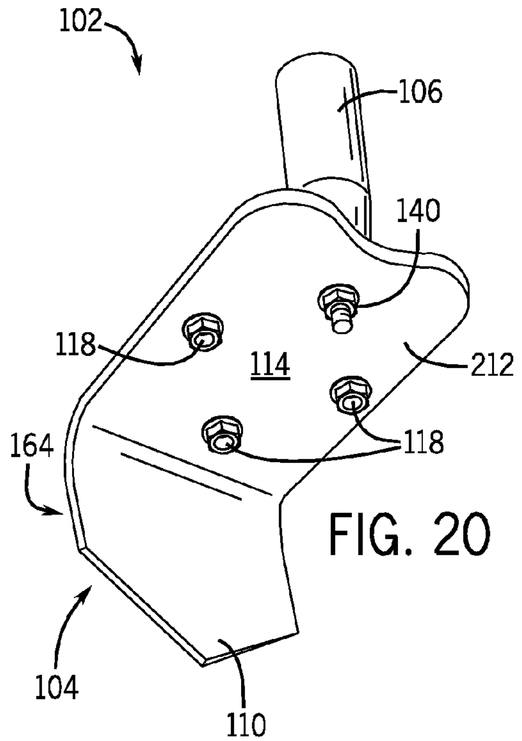
FIG. 20 is a rear perspective view of one or more alternative examples of a material moving tool, showing a material moving tool with a blade or spike implement.
Figure 19:
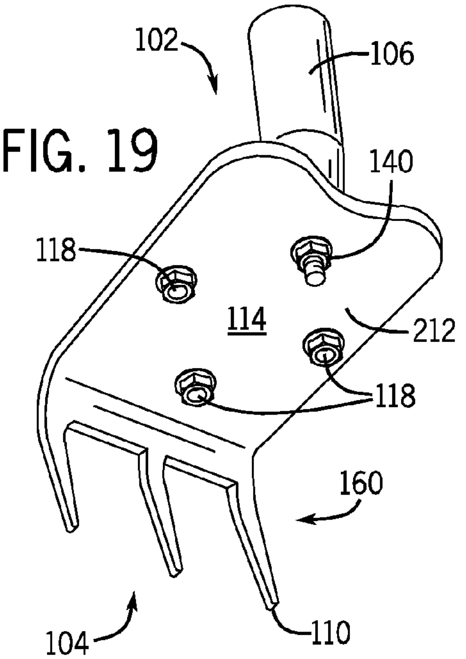
FIG. 19 is a rear perspective view of one or more alternative examples of a material moving tool, showing a material moving tool with a cultivator implement.
Figure 22:
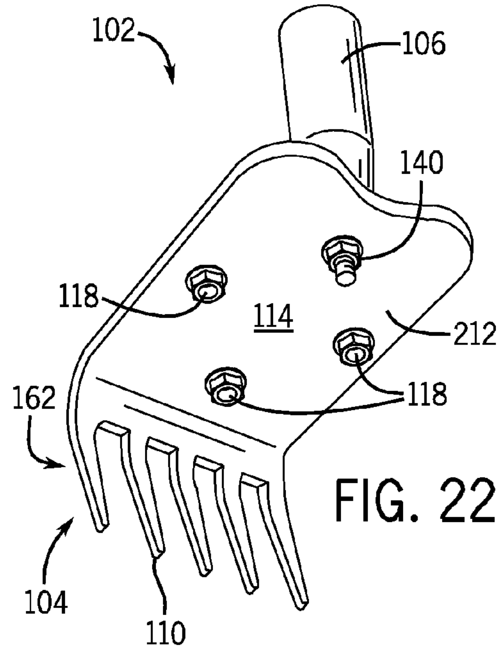
FIG. 22 is a rear perspective view of one or more alternative examples of a material moving tool, showing a material moving tool with a rake implement.
Figure 21:
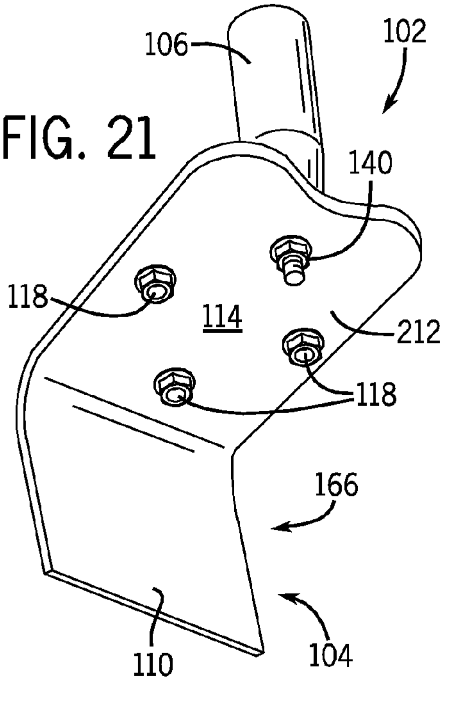
FIG. 21 is a rear perspective view of one or more alternative examples of a material moving tool, showing a material moving tool with a hoe implement.
Figure 23:
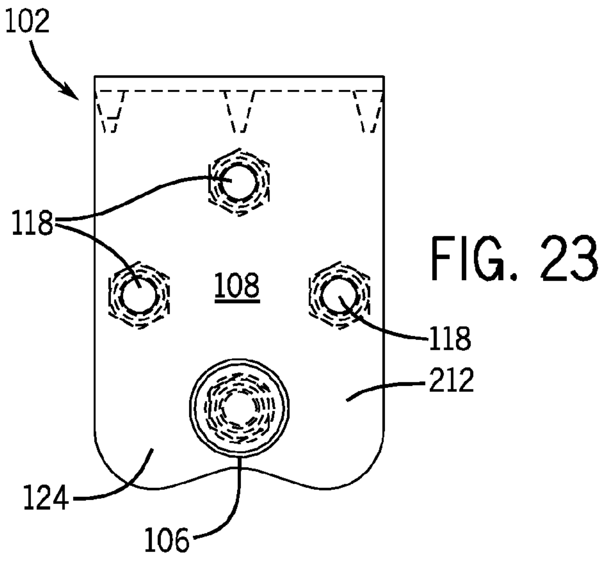
FIG. 23 is a top plan view of the material moving tool shown in FIG. 19.
Figure 24:
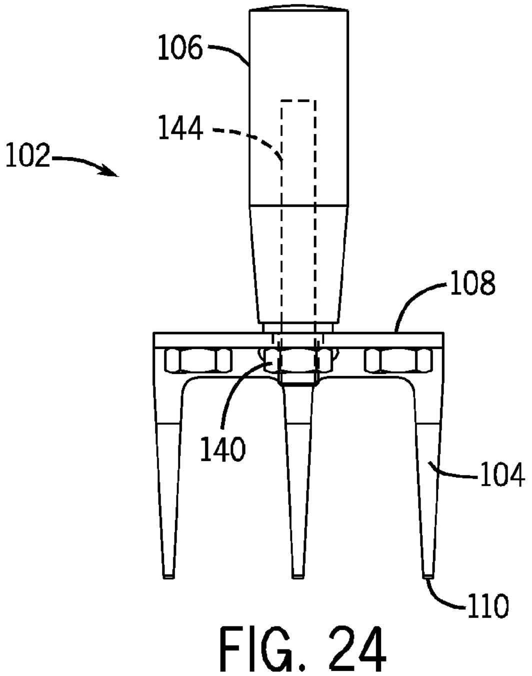
FIG. 24 is a rear elevation view of the material moving tool shown in FIG. 19.
Figure 25:
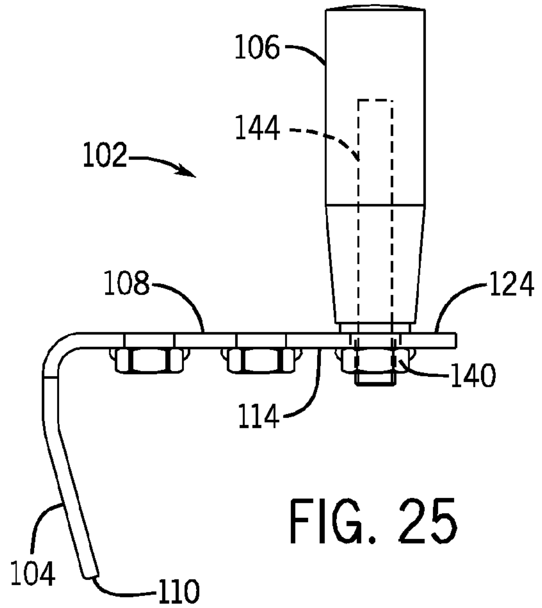
FIG. 25 is a side elevation view of the material moving tool shown in FIG. 19.
Figure 26:
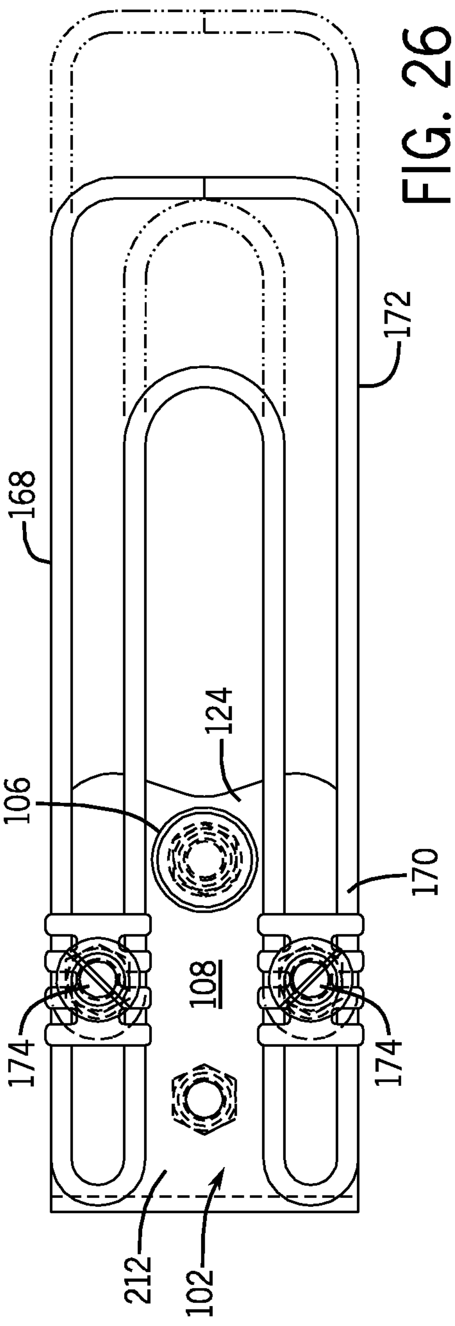
FIG. 26 is a top plan view of a material moving tool shown in FIG. 19, including an arm support coupled thereto
Figure 27:
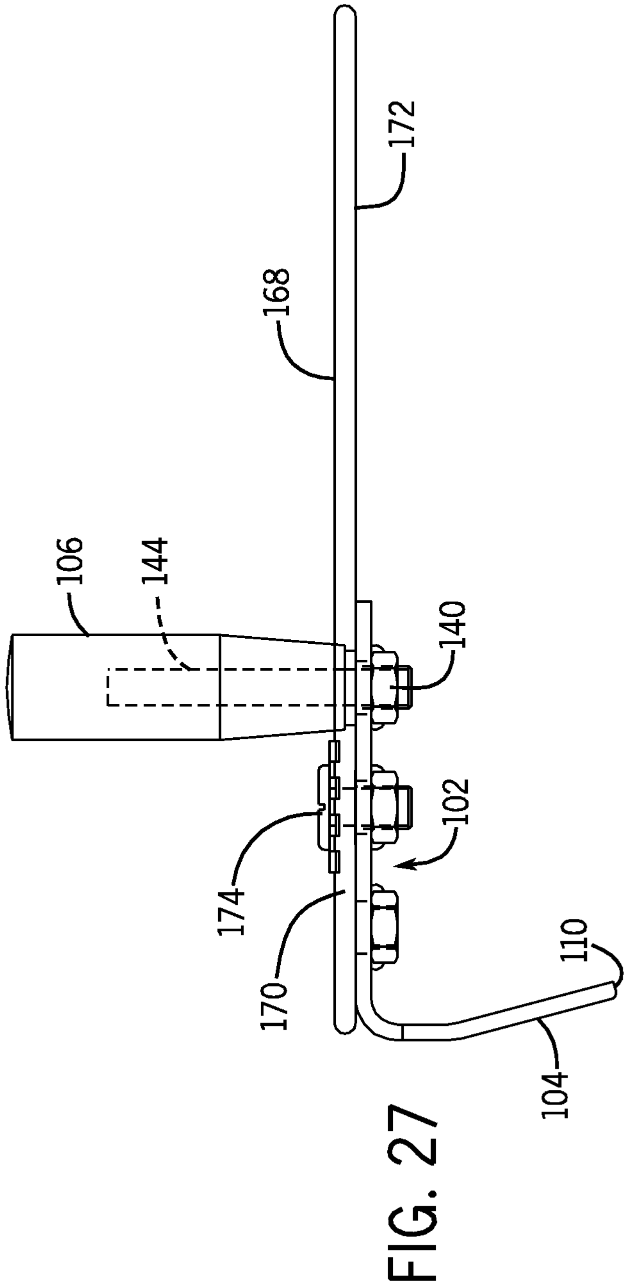
FIG. 27 is a side elevation view of the material moving tool shown in FIG. 19, including an arm support coupled thereto.

In one or more alternative examples of embodiments, an accessory tool 156 may be joined to the material moving tool 102. In the illustrated example shown in FIGS. 16-18, the accessory tool 156 is joined to the tool body 112. The accessory tool 156 may be optionally detachably joined to the tool body 112. To this end, the accessory tool 156 may be coupled to the tool body 112 by one or more attachment devices, such as for example screws or threaded devices 158 which insert through apertures in the accessory tool 156 and into mating apertures 120 in the tool body 112. Alternative fastening devices would also be acceptable for purposes of the present invention. In the illustrated embodiment, the accessory tool 156 is a pick, but may include, brushes or bristles, blade(s), a squeegee, and the like. However, the accessory tool 156 may be any device suitable for use as a companion to the implement 104 upon which it is placed. Likewise, the accessory tool 156 may be attached in any location suitable for its intended purpose.

One or more alternative examples of embodiments of a hand held material moving tool 102 are illustrated in FIGS. 19-22. In regards to FIGS. 19-22, certain features are substantially identical to features discussed in reference to FIGS. 1-18, and therefore, like features have been identified with the same reference numbers.

In the examples illustrated in FIGS. 19-22, the material moving tool 102 has a smaller size and can be operated with one hand. In this regard, the tool body 212 is provided having a plurality of apertures 118. The apertures 118 are adapted to receive a portion of a handle 106. The handle 106 may be positioned in any one or more of the apertures 118 and secured as previously discussed herein. As a result, the handle 106 can be located for optimal use of the tool. The handle 106 may also be a pivotable handle, as previously described, or otherwise include a swivel mechanism 144 permitting pivot or rotation of the implement 104 in relation to the handle. It is also contemplated that more than one handle 106 may be attached. The one or more examples of a tool illustrated in FIGS. 19-22 are smaller in size. For example, a rake having fewer tines or an implement 104 spanning across a shorter distance than that shown in FIGS. 1-18. As one illustrative example, a rake or cultivator may be provided with approximately 5 tines spanning a distance of 3 to 4 inches in width. While the tool is smaller in size, any of the described implements, previously described herein may be joined to the tool body 112, including but not limited to, for example, an implement 104 having a plurality of tines 138 such as a cultivator 160 (FIG. 19) or a rake 162 (FIG. 22), or the implement 104 may be a pick 164 (FIG. 20), a blade 166 (FIG. 21), or other material moving implements. Likewise, the dimensions provided are for purposes of example only.

In one or more examples of embodiments, an arm support 168 may be provided for use with a material moving tool 102. The arm support 168 is shown in FIGS. 23-27. The arm support 168 includes an area 170 for attachment to the material moving tool 102 and a support segment 172 extending therefrom for support of a user's arm or wrist. The attachment area 170 has one or more fasteners or areas receiving a fastener which may be secured to the material moving tool 102. For example, a fastener 174, or more than one fastener may be received and secured in an aperture(s) 118 in the material moving tool 102 and the connecting area 170 of the arm support 168 or may otherwise couple the arm support 168 and tool. The support segment 172 has an area sized to rest against a portion of the user's arm or wrist. In the illustrated example, the arm support 168 is formed by a wire frame coupled to the material moving tool 102 by washers and flat slotted head bolts 174 which extend through spacings between wire frame elements and into apertures 118 on the tool. While a specific example of an arm support is illustrated, alternative materials, forms, and devices may be acceptable for the purposes provided.

The tool body, implement, swivel mechanism, handle, accessory tool, and/or arm support described herein may be formed of any materials or combination of materials suitable for the purposes provided. In one or more examples of embodiments, the tool body, implement, and/or pivot arm are formed of a material of sufficient rigidity and strength to withstand the force of pulling and/or pushing of the tool through a particular material as defined herein. More specifically, one or more of the devices described herein may be formed of a plastic or polymer, or may be formed of a metal, such as but not limited to steel or stainless steel, galvanized, and painted or uncoated or un-galvanized durable metals. The implement may further be formed of materials suitable for its intended use. As an illustrative example, a brush or broom-type implement may include a plurality of bristles. Further, the handle or handles may be formed of any material or combination of materials having a rigidity and strength suitable for the purposes provided. The handles may be formed of the same materials as the tool body, implement, and/or pivot arm, or alternative materials. In this regard, the handles may be formed of metal or plastic, or a combination thereof. As an illustrative example, the handle may be a metal handle or have a metal shaft and a plastic or polymer sleeve that rotates about the shaft; or may include a plastic or polymer grip knob secured to a metal shaft. In the alternative, the handle may be made of rubber or have a rubberized, textured, or foam-type surface.

The material moving tool 102 is formed by any suitable mechanism relative to the materials desired. For example, the material moving tool 102 may be formed by a mold. The material moving tool 102 may also or alternatively be cut or fabricated from a sheet of material. The implement may be integral, or may be formed separately and attached to the tool body 112, 212. Optionally, the implement may be formed by bending a segment or multiple segments to a predefined degree. One or more apertures 116, 118, 120, 122 may be cut and/or threaded in the tool body 112, 212. The handles 106 or handle assembly may be formed separately and attached to the tool body 112, 212 as previously described.

Figure 28:
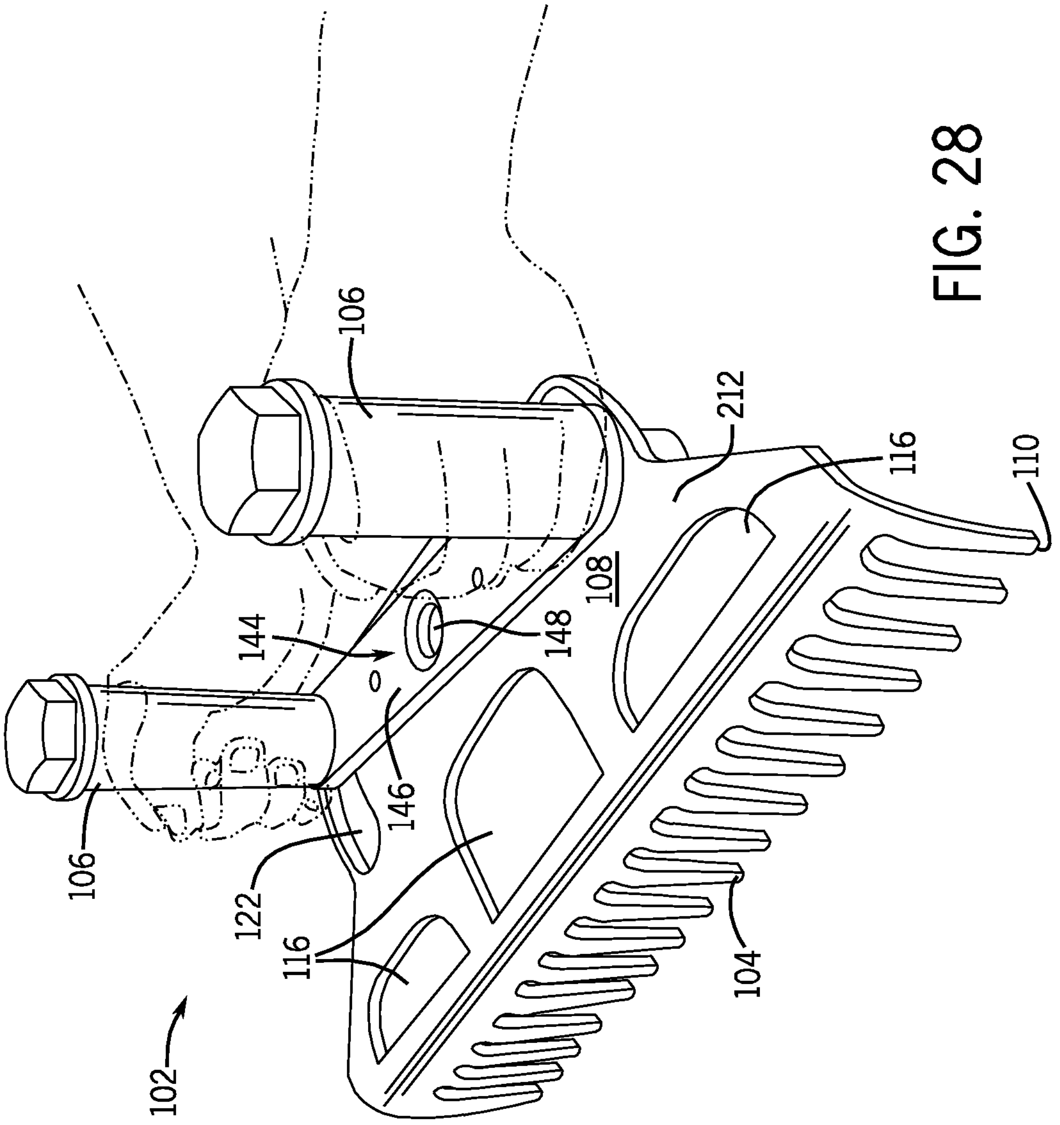
FIG. 28 is a perspective view of the material moving tool shown in FIG. 7, showing an example of user interaction with the tool.

Referring to FIG. 28, in operation of one or more examples of embodiments, a user grasps the handle or handles 106 with his or her hands. The tool 102 is then placed in contact with the material which is to be moved by the tool, which positions the user's hand(s) in close proximity to the material. The material may be elevated, such as in a container, or may be on the ground. In operation, the tool 102 is moved by the user's hand(s) and bicep muscles which move the tool in a horizontal movement toward the body in the same direction as the movement of material. The swivel mechanism 144 of the tool 102 pivots the implement 104 in relation to the handle(s) 106 to adjust for obstructions encountered in the material and to permit the user to reach material which is not directly in front of the user. Further, the swivel mechanism 144 also permits a user to move material around an object.

As indicated, the material moving tool is designed for use by a user's hands in close proximity to the material such as, for example, at ground level with the user low and on their knees. This positioning results in a higher amount of material moved as the user is able to apply more force and reach engage the tool with the material at a more effective angle. The tool works equally well with right or left dominant hands, as it either includes a single handle or includes two equal-distant or spaced apart handles and a swivel or pivot mechanism. The handle(s) may also be detached and repositioned for optimal performance and comfort. Additionally, the tool works effectively in tight spaces and is useful to access material that is under an object or when headroom is minimal due to its low profile and low work profile of the user. Further, the angle of the implement such as, for example, a rake head, in relationship to the ground and the amount of force that can be applied in the same position results in higher capacity and more efficient movement of material.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. A hand held material moving tool comprising:

a material engaging implement having a body and a material engaging portion coupled to the body and adapted for movement of material;

a pair of handles connected to a top surface of the tool, the handles being positioned low and in close proximity to the material engaging portion of the implement, wherein the handles have a grip extending perpendicular to the top surface of the tool and immediately above the body; and wherein the pair of handles are connected to the tool by a swivel mechanism permitting a predetermined amount of pivot of the implement in relation to the pair of handles about an axis.

2. The hand held material moving tool of claim 1 wherein the material engaging portion of the implement is a head for an earth material moving application.

3. The hand held material moving tool of claim 2 wherein the head is selected from the group consisting of a rake head, a leaf rake, a blade, a hoe, and bristles.

4. The hand held material moving tool of claim 1, wherein the swivel mechanism is a pivot bar mounted to the tool and carrying the handles.

5. The hand held material moving tool of claim 4, wherein a handle from the pair of handles includes a portion received within a slot on the tool.

6. The hand held material moving tool of claim 1, wherein the pair of handles are pivotable, whereby the pair of pivotable handles form the swivel mechanism.

7. The hand held material moving tool of claim 1, further comprising a tension adjustment device for modifying the freedom of rotation about the axis.

8. The hand held material moving tool of claim 1 wherein the handles are selectively detachable and positionable in a plurality of positions on the body.

9. The hand held material moving tool of claim 1, wherein the handles are adjustable.

10. The hand held material moving tool of claim 1 wherein the handles are interchangeable with an additional pair of handles.

11. The hand held material moving tool of claim 1, further comprising an accessory tool coupled to the top surface of the body of the tool.

* * * * *